(12) United States Patent
Mizuno et al.

(10) Patent No.: US 6,442,833 B1
(45) Date of Patent: Sep. 3, 2002

(54) METHOD OF STRIPPING ELECTRIC WIRE

(75) Inventors: Akihiro Mizuno; Hiroshi Furuya, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/526,721

(22) Filed: Mar. 16, 2000

(30) Foreign Application Priority Data

Mar. 19, 1999  (JP) ............................................ 11-075851
Oct. 8, 1999  (JP) ............................................ 11-287912

(51) Int. Cl.⁷ .............................................. H01R 43/00
(52) U.S. Cl. ........................ 29/867; 29/564.8; 29/33 F; 81/9.42
(58) Field of Search ................................ 81/9.51, 9.42; 29/828, 867, 564.8, 33 F, 33 M

(56) References Cited

U.S. PATENT DOCUMENTS 3,363,309 A  *  1/1968  Logan et al. .................. 29/867
4,094,214 A  *  6/1978  Bradley ....................... 30/90.1

* cited by examiner

*Primary Examiner*—Rick K. Chang
(74) *Attorney, Agent, or Firm*—Armstrong, Westerman & Hattori, LLP

(57) ABSTRACT

In a method of stripping an insulated electric wire, circumferential cuts are formed in an insulating coating of the electric wire by use of circumferential cutters and then the circumferential cutters are moved in a longitudinal direction of the electric wire to separate cut pieces of the insulating coating from itself. After longitudinal cuts have been formed in the insulating coating by use of longitudinal cutters the insulating coating is removed by an air blow and an upper waste coating is sucked by a vacuum. Longitudinally cut edges of the insulating coating are abutted against shoulders which continue by intersection with inclined outer faces of cutting edges of the longitudinal cutters. A lower waste coating falls by a self weight between a pair of the longitudinal cutters. An ultrasonic horn may be employed to press the insulating coating toward the longitudinal cutters while making ultrasonic vibrations.

10 Claims, 10 Drawing Sheets

METHOD OF STRIPPING ELECTRIC WIRE

BACKGROUND OF THE INVENTION

1. Field of the Invention

The present invention relates to a method of automatically stripping off an insulating coating of an insulated electric wire at an intermediate portion in a longitudinal direction thereof.

2. Description of the Related Art

Referring to FIGS. 18 to 21, a conventional method of stripping an insulated electric wire will be described below.

This method of stripping the electric wire is to remove an insulating coating 1a at an intermediate portion of an electric wire 1 in a longitudinal direction. First of all, as shown in FIG. 18, circumferential cuts are formed in the insulating coating 1a of the electric wire 1 at two positions which are separated in a longitudinal direction from each other, by means of two pairs of circumferentially cutting cutters (hereinafter referred to as "circumferential cutters") 55–58 each located vertically or laterally. Each of the circumferential cutters 55–58 has cutting edges 59, 60 substantially in V shape as seen in FIG. 19. The insulating coating 1a is cut substantially in a rhombic shape to leave portions 40–43 uncut (connected parts) above and below as well as at the left and the right of a core 1b.

Then, as shown in FIGS. 20A and 20B, a pair of left and right longitudinally cutting cutters (hereinafter referred to as "longitudinal cutters") 63, 64 are positioned in a vertical direction below the insulating coating 1a' between the forward and backward circumferential cuts 61, 62. The electric wire 1 is pressed by a ultrasonic horn 28 from the above toward the longitudinal cutters 63, 64 with ultrasonic vibrations to form longitudinal cuts at both sides of the insulating coating 1a'. A distance between a pair of the cutters 63, 64 is substantially equal to an outer diameter of the core 1b of the electric wire 1. With this operation, the insulating coating 1a' is divided into an upper and a lower parts between the forward and backward circumferential cuts 61, 62. At the forward and backward circumferential cuts 61, 62, the insulating coatings 1a, 1a' (FIGS. 20A and 20B) are not separated but connected as shown in FIG. 19 above and below as well as at the left and the right of the core 1b.

Finally, as shown in FIG. 21, the upper and the lower insulating coatings (waste coatings) 65, 66 are manually removed by an operator by pulling them from the electric wire 1 in upward and downward directions. By pulling the insulating coating 1a' (FIGS. 20A and 20B) in the upward and downward directions, the connected parts 40–43 (FIG. 19) of the insulating coatings 1a, 1a' above and below as well as at the left and the right are completely cut away. The waste coatings 65, 66 are dropped on a bottom of a stripping machine (not shown) in situ and gathered by the operator afterward for a cleaning treatment.

To the core 1b exposed at the intermediate position of the electric wire 1 as shown in FIG. 21 is connected an end portion of another electric wire (not shown), for example, by means of a joint terminal or welding for branching. Alternatively, a positioning terminal (not shown) is press fitted to the core 1b, and the electric wire 1 is positioned and fixed in a longitudinal direction inside a connector housing which is not shown.

However, in the above described conventional stripping method for an insulated electric wire, the operator must remove the waste coatings 65, 66 from the electric wire 1 by hand. Therefore, the conventional method has had such a problem that a productivity is low because it takes a number of working steps, and a problem in quality because the removal of the waste coatings 65, 66 are likely to be forgotten. There is another problem that after the circumferential cuts are formed in the insulating coating 1a, the electric wire 1 is likely to slacken, which incurs inaccuracy in forming the longitudinal cuts in the later steps. In such a case, the removal of the insulating coating 1a cannot be done well and cut faces of the insulating coating 1a get ugly, which results in a problem of quality. Further, because the insulating coating 1a is removed by hand in a manner of tearing it off, the cut faces of the insulating coating 1a are likely to chap, which also results in a problem of quality. Moreover, such cleaning work by the operator that he must gather the waste coatings 65, 66 which have fallen on the bottom of the stripping machine has been very annoying.

Therefore, it is an object of the present invention to provide a method of stripping an electric wire in which an insulating coating can be automatically removed (peeled) reliably and beautifully, and a reduction of the working steps and improvements in productivity as well as in quality can be attained.

SUMMARY OF THE INVENTION

In order to attain the above described object, a gist of the invention resides in a method of stripping an electric wire in which circumferential cuts are formed in an insulating coating of the electric wire by means of circumferential cutters, and then longitudinal cuts are formed in the insulating coating by means of longitudinal cutters to remove the insulating coating, comprising the steps of moving the circumferential cutters in a longitudinal direction of the electric wire in a state where the circumferential cuts have been formed in the insulating coating by means of the circumferential cutters, and disconnecting cut pieces of the insulating coating from each other at those parts where the circumferential cuts are formed.

According to another feature of the invention, pairs of wire clamps are arranged at both sides of pairs of the circumferential cutters, the circumferential cutters conducting, in a state where the one pair of the wire clamps hold the electric wire and the other pair of the wire clamps are released, a first movement toward the other pair of the wire clamps, the circumferential cutters then conducting, in a state where the other pair of the wire clamps hold the electric wire and the one pair of the wire clamps are released, a second movement toward the one pair of the wire clamps along a distance longer than the first movement.

According to a further feature of the invention, after the circumferential and longitudinal cuts have been formed in the insulating coating respectively by means of the circumferential cutters and the longitudinal cutters, the insulating coating is removed by an air blow and waste coatings can be sucked by a vacuum.

According to a still further feature of the invention, when the longitudinal cuts are formed in the insulating coating by means of the longitudinal cutters, longitudinally cut edges of the insulating coating are adapted to abut against shoulders which continue by intersecting with inclined outer faces of cutting edges of the longitudinal cutters respectively.

According to a still further feature of the invention, a lower portion of the waste coating is dropped by its self weight between a pair of the longitudinal cutters.

There is further provided a method of stripping an electric wire in which circumferential cuts are formed in an insulating coating of the electric wire by means of circumferential cutters, and then longitudinal cuts are formed in the insulating coating by means of longitudinal cutters to remove the insulating coating, comprising the steps of forming the longitudinal cuts in the insulating coating by means of the longitudinal cutters, and abutting longitudinally cut edges of the insulating coating against shoulders which continue by intersecting with inclined outer faces of cutting edges of the longitudinal cutters respectively.

According to a further feature of the invention, the insulating coating is removed by an air blow in a state where the longitudinally cut edges of the insulating coating have abutted against the shoulders.

According to a still further feature of the invention, the insulating coating of the electric wire is pressed toward the longitudinal cutters while making ultrasonic vibrations by means of a ultrasonic horn.

The above and other objects, features and advantages of the invention will become more apparent from the following detailed description of a preferred embodiment taken in connection with the accompanying drawings.

DESCRIPTION OF THE PREFERRED EMBODIMENT

FIGS. 1 to 17 show an embodiment of a method of stripping an electric wire according to the invention.

Figure 15:
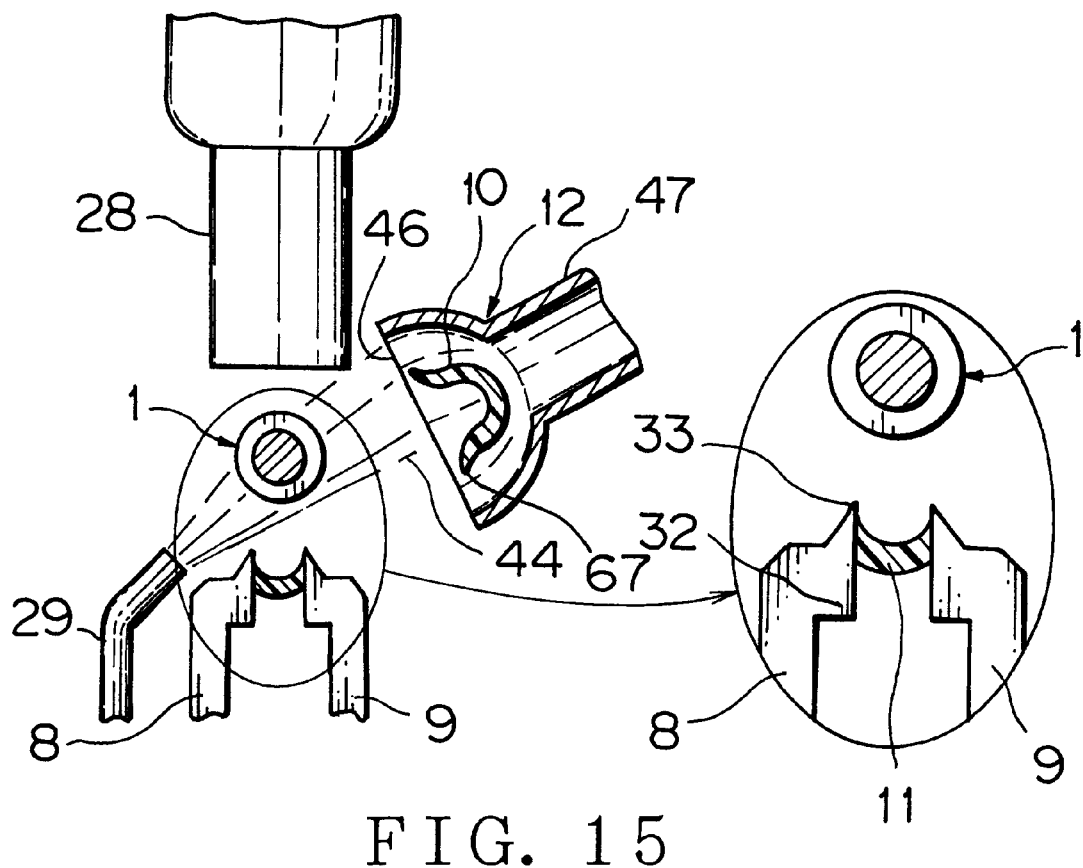
FIG. 15 is a front view partly in section illustrating an air blowing step in a thirteenth step.

This electric wire stripping method comprises steps of forming circumferential cuts in an intermediate portion of an insulating coating 1a in a longitudinal direction by means of pairs of circumferential cutters 2–5 located respectively in backward and forward positions, moving the circumferential cutters 2–5 back and forth in a longitudinal direction so as to completely separate the insulating coating 1a from a matrix (insulating coating), then, forming longitudinal cuts in the separated insulating coating 1a' (FIG. 9) by means of a pair of longitudinal cutters 8, 9 (FIG. 13), and finally removing a waste coating 10 from the electric wire 1 by an air blow and sucking the waste coating by means of a vacuum 12 (FIG. 15).

Now, the method of stripping the electric wire will be described in detail hereunder on each step with reference to the drawings.

Figure 1:
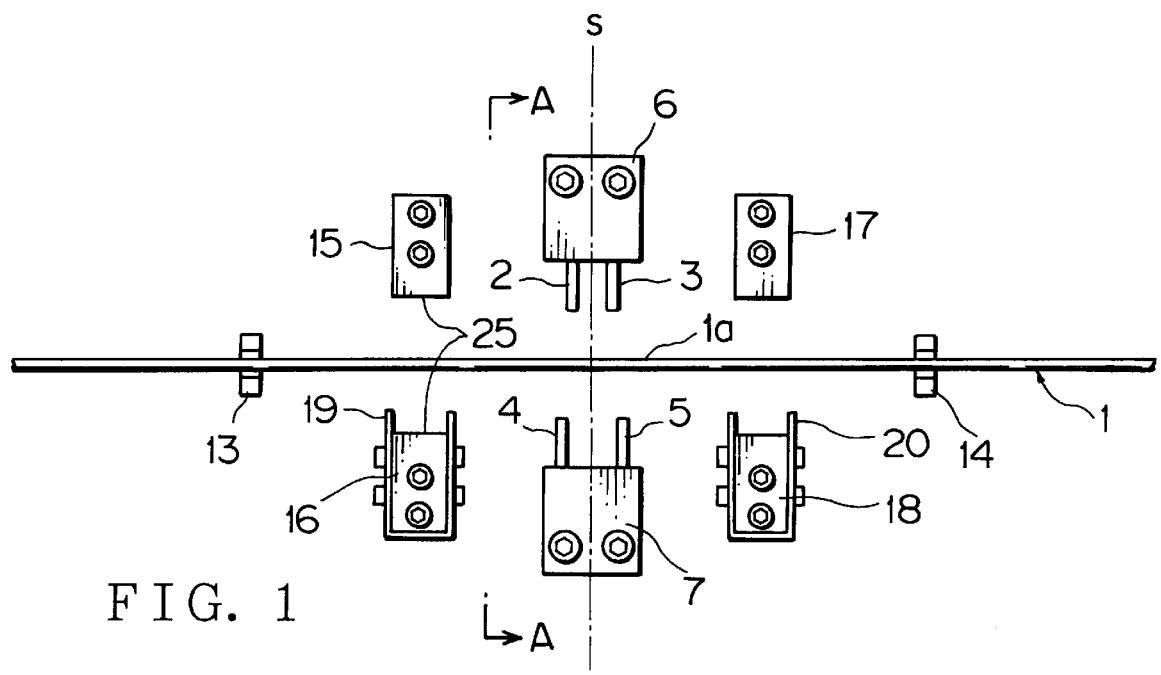
FIG. 1 is a plan view illustrating a step of setting an insulated electric wire in a first step of a method of stripping the insulated electric wire according to the invention.

First of all, as shown in FIG. 1, the electric wire 1 is held by a pair of wire setting guides 13, 14 which are respectively positioned backward and forward in a longitudinal direction of the electric wire. At an intermediate position between a pair of the wire setting guides 13, 14, are arranged pairs of the circumferential cutters 2–5 respectively on a left hand and a right hand. At both sides of each pair of the circumferential cutters 2–5 are disposed pairs of wire clamps 15–18 respectively on a left and a right hands.

Pairs of the circumferential cutters 2–5 are fixed to respective cutter holders 6, 7. A distance between the one pair of the circumferential cutters 2, 3 is set smaller than a distance between the other pair of the circumferential cutters 4, 5, so that outer faces of the one pair of the circumferential cutters 2, 3 contact with inner faces of the other pair of the circumferential cutters 4, 5. Each of the cutter holders 6, 7 is movable in a diametrical direction of the electric wire by means of actuating means which are not shown. A symbol s in the drawings shows a center line passing the cutter holders 6, 7.

The pairs of the wire clamps 15–18 are also movable in the diametrical direction of the electric wire (to be released and closed) by means of actuating means which are not shown. The wire clamps 15, 16 and the wire clamps 17, 18 can be separately released and closed, and are also movable in the diametrical direction of the electric wire independently of the cutter holders 6, 7.

Figure 2:
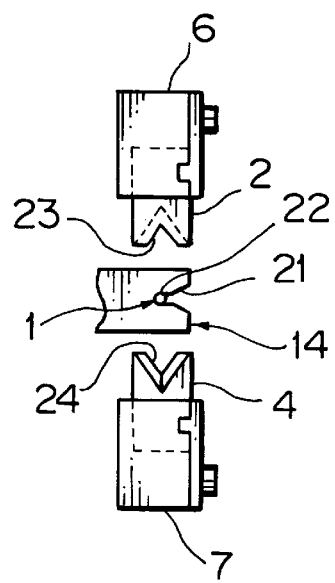
FIG. 2 is a front view as viewed in a direction of arrows A—A in FIG. 1.

As shown in FIG. 2 (a front view as seen in a direction of arrows A in FIG. 1), the wire setting guide 14 (the wire setting guide 13 too) has a V-shaped guide groove 21 and a circular holding groove 22 in continuation with the guide groove 21 so that the electric wire 1 can be held within the holding groove 22 so as not to be withdrawn. The circumferential cutters 2, 4 (the circumferential cutters 3, 5 too) have V-shaped cutting edges 23, 24 respectively, and are fixed to the cutter holders 6, 7 at their base parts by means of bolts. The wire clamps 15–18 have faces 25 for pressing the electric wire at their distal ends. The one pair of the wire clamps 16, 18 have V-shaped electric wire guide plates 19, 20 at both sides thereof.

Figure 3:
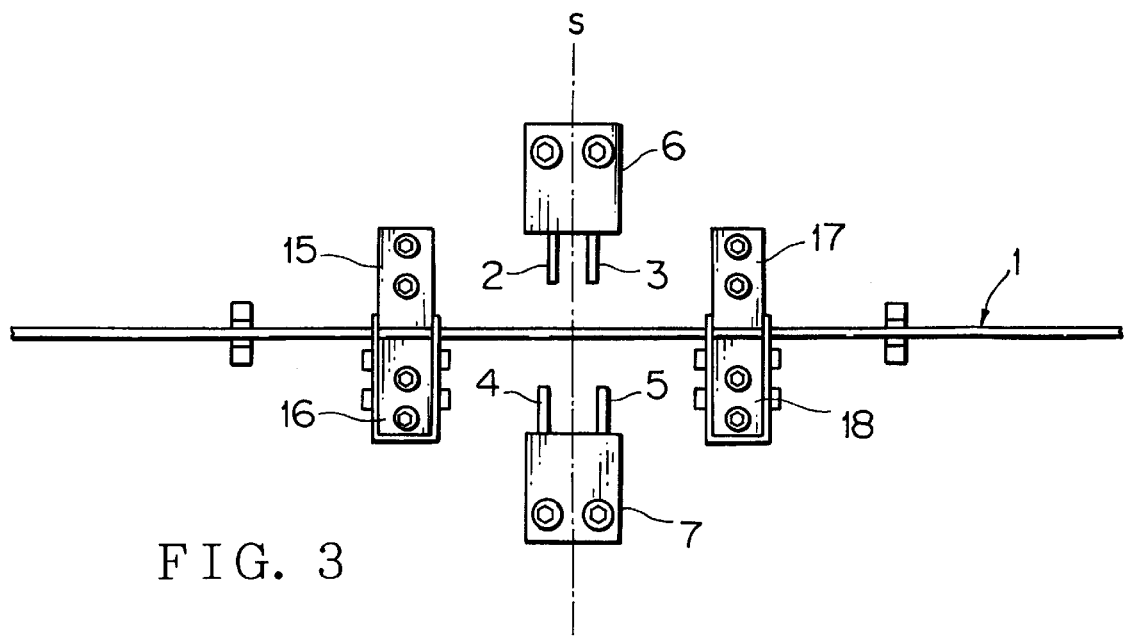
FIG. 3 is a plan view illustrating a step of clamping the electric wire in a second step of the method of stripping the electric wire.
Figure 4:
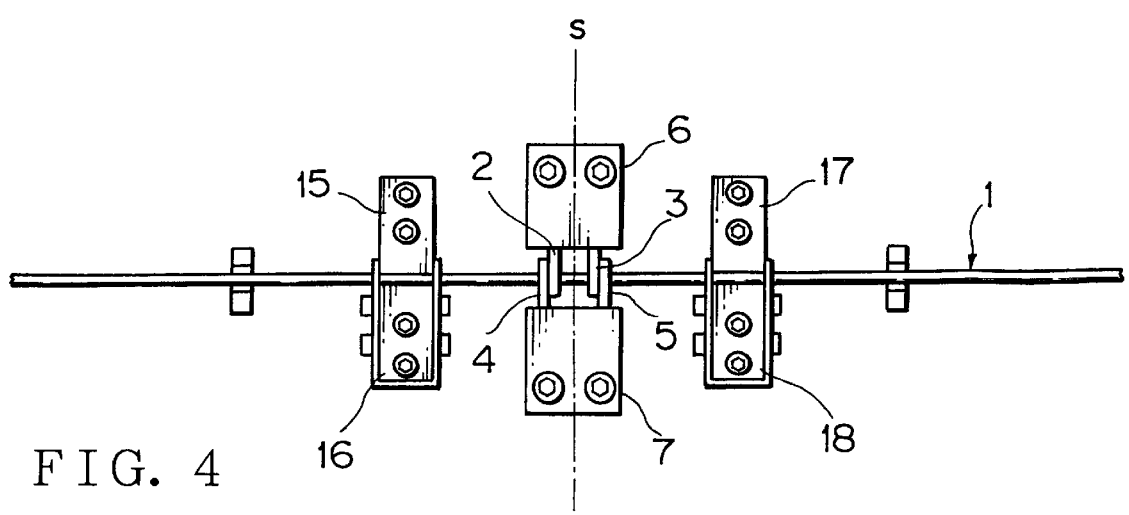
FIG. 4 is a plan view illustrating a step of forming circumferential cuts in a third step.
Figure 19:
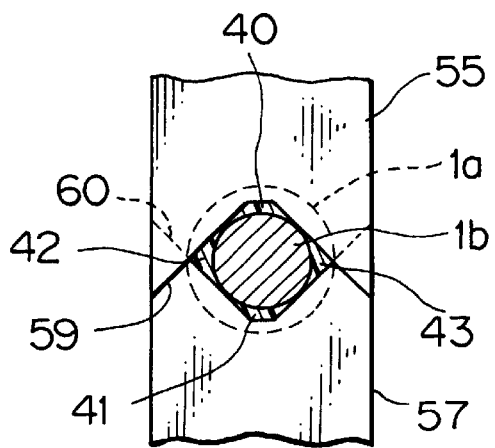
FIG. 19 is a front view in a vertical section illustrating the electric wire in a state the circumferential cuts have been formed.
Figure 20A:
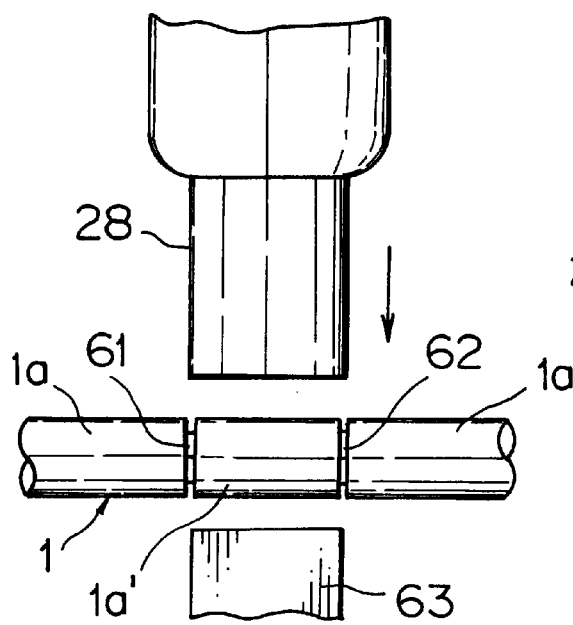
FIG. 20A is a side view illustrating a step of forming longitudinal cuts in the conventional method.
Figure 20B:
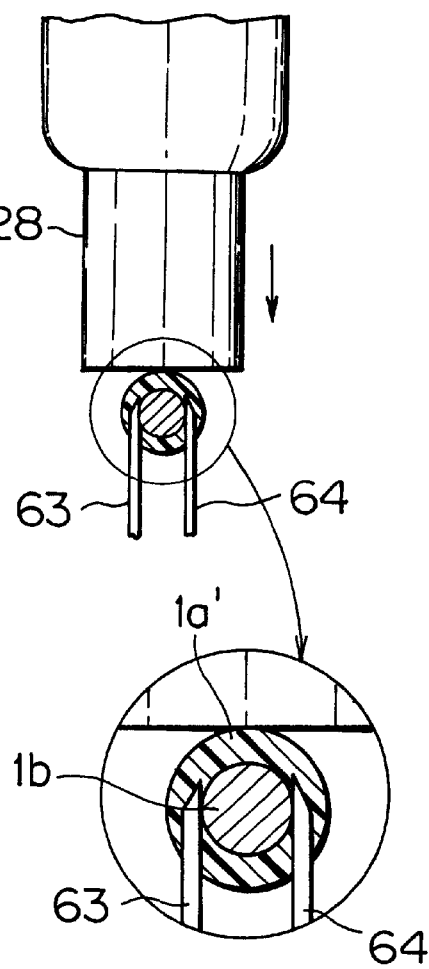
FIG. 20B is a front view of FIG. 20.
Figure 21:
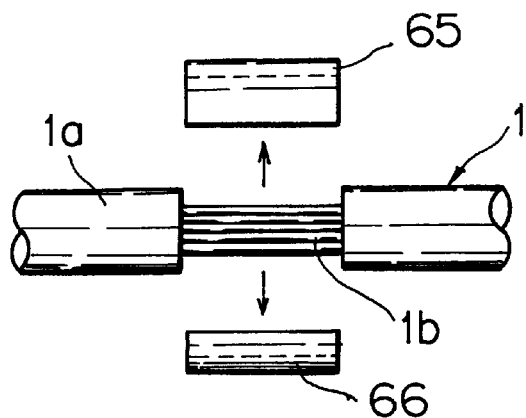
FIG. 21 is a side view illustrating a step of removing waste coatings in the conventional method.

At a first step, as shown in FIG. 3, the wire clamps 15–18 are respectively closed to clamp the electric wire 1. Then, as shown in FIG. 4, the cutter holders 6, 7 are moved in the diametrical direction of the electric wire so as to form the circumferential cuts in the insulating coating from both sides in the diametrical direction of the electric wire by means of the circumferential cutters 2–5. This situation is similar to that of the conventional case as shown in FIG. 19.

Figure 5:
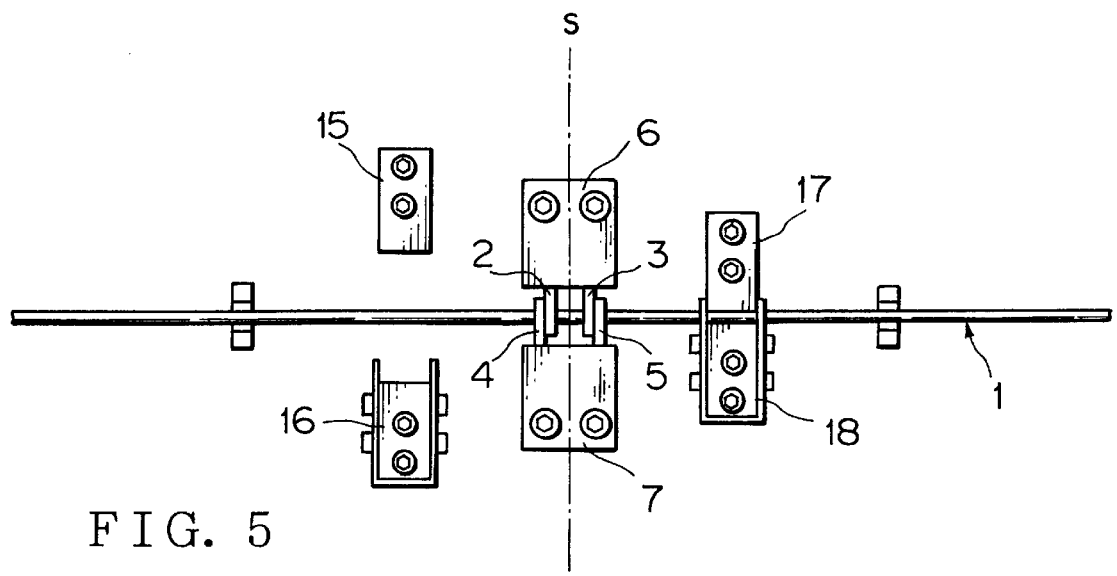
FIG. 5 is a plan view illustrating a step of disengaging one of the clamps of the electric wire in a fourth step.
Figure 6:
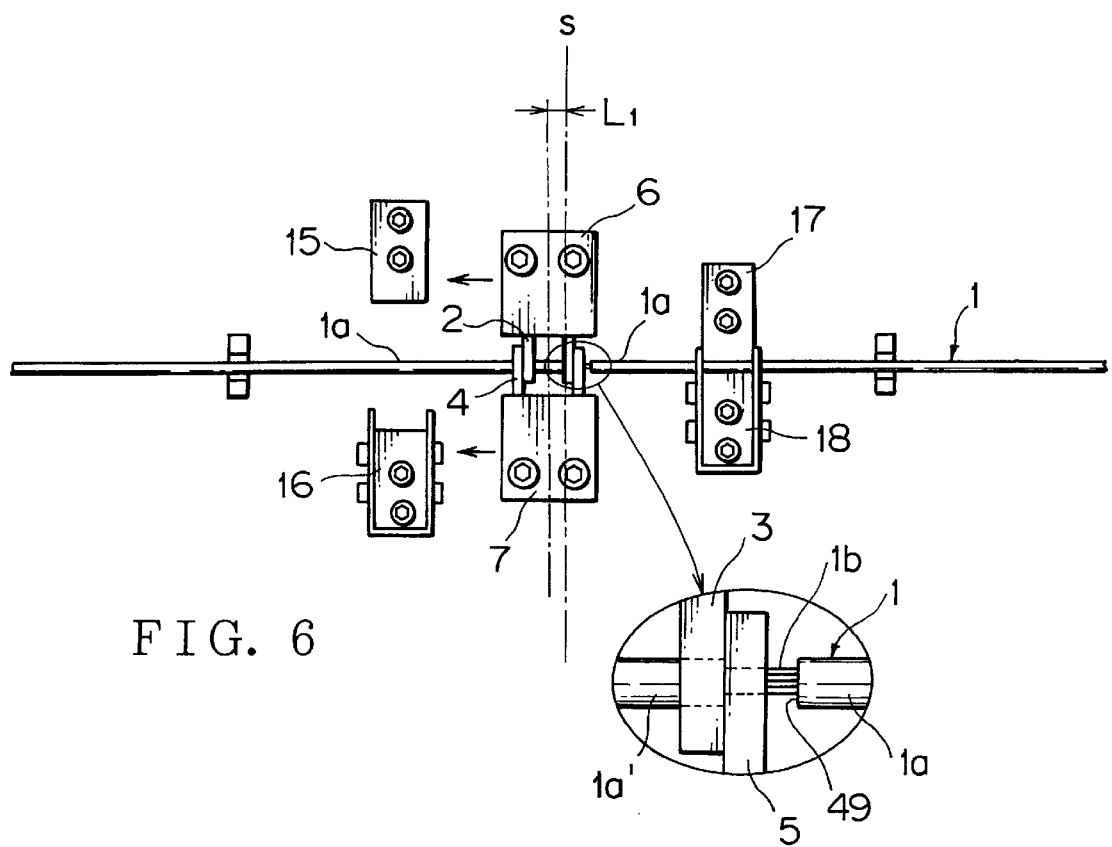
FIG. 6 is a plan view illustrating a step of moving circumferential cutters in a fifth step.

Then, as shown in FIG. 5, keeping the one pair of the wire clamps 17, 18 closed, the other pair of the wire clamps 15, 16 are released. And as shown in FIG. 6, a pair of the cutter holders 6, 7 are slightly moved integrally with the circumferential cutters 2–5 toward the other pair of the wire clamps 15, 16, while the circumferential cutters 2–5 are closed. An amount of this movement L1 is as small as 2–5 mm.

With the described movement, a circumferentially cut part 49 of the insulating coating 1a of the electric wire 1 is completely separated outside the circumferential cutters 3, 5 adjacent to the one pair of the wire clamps 17, 18. In other words, because the insulating coating 1a of the electric wire 1 is clamped by the one pair of the wire clamps 17, 18, the insulating coating 1a will be pulled between the one pair of the wire clamps 17, 18 and the circumferential cutters 3, 5 and cut apart, when the insulating coating 1a' is moved toward the other pair of the wire clamps 15, 16 by means of the circumferential cutters 2–5. On this occasion, the insulating coating 1a' is compressed toward the other pair of the clamps 15, 16 by the amount of the movement of the insulating coating 1a'. However, the compression of the insulating coating 1a' will be absorbed in a longitudinal direction, because the other pair of the wire clamps 15, 16 are released, and the insulating coating 1a' will not slacken.

Figure 7:
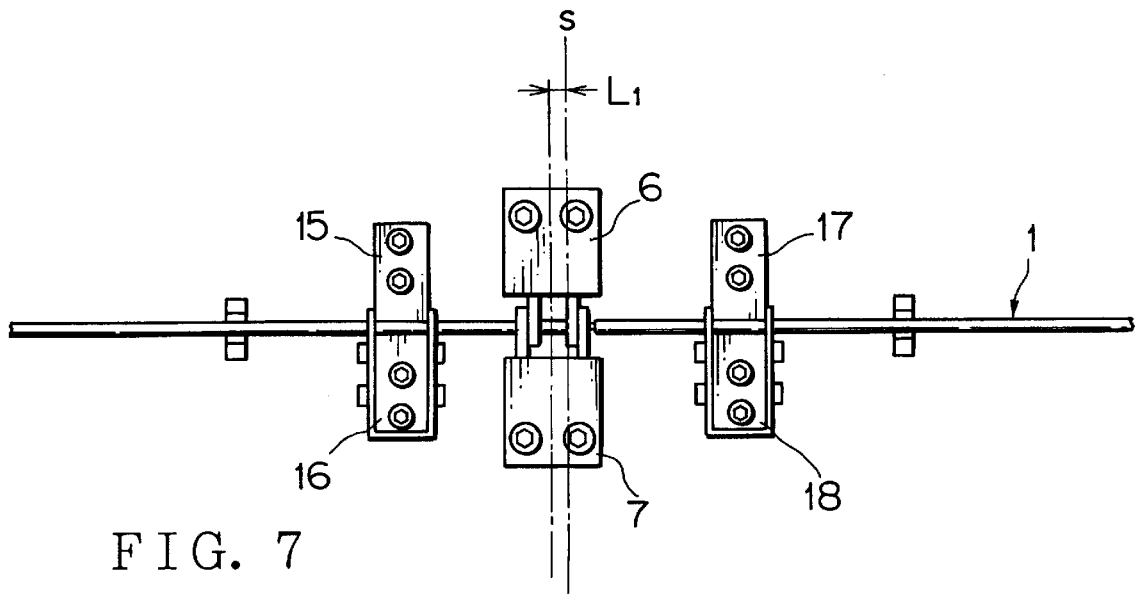
FIG. 7 is a plan view illustrating a step of clamping the electric wire in a sixth step.

Then, the other pair of the wire clamps 15, 16 are closed as shown in FIG. 7. The cutter holders 6, 7 are maintained in a state where they have been moved by the distance L1. The electric wire 1 is clamped by the wire clamps 15, 16 in the step of FIG. 7, in a state where the slack of the insulating coating 1a' is absorbed in the step of FIG. 6, and therefore, the electric wire 1 will not slacken.

Figure 8:
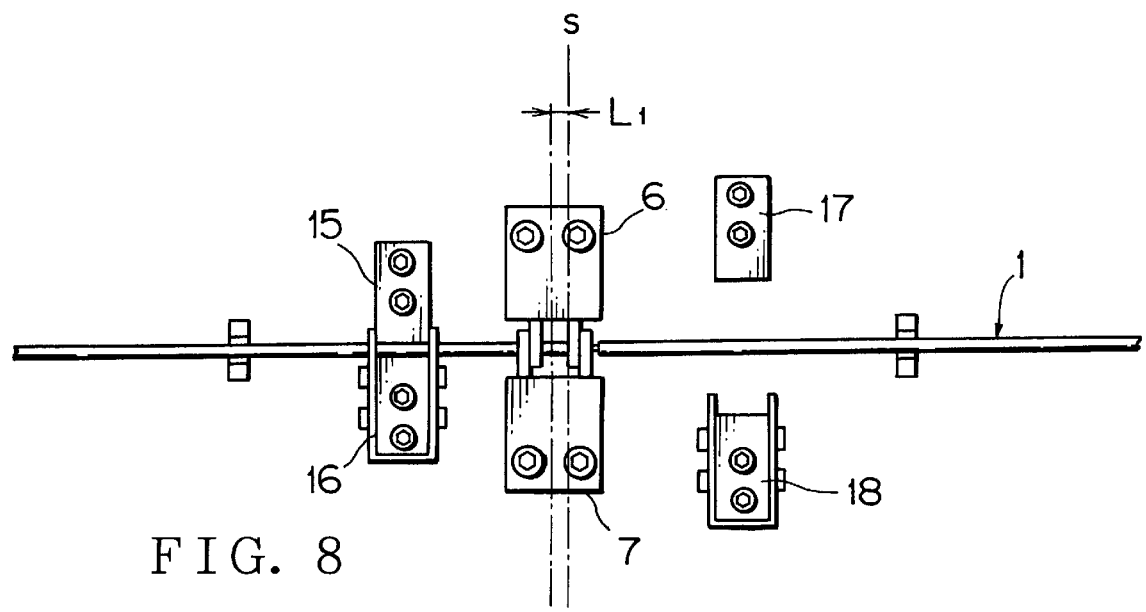
FIG. 8 is a plan view illustrating a step of disengaging the other clamp of the electric wire in a seventh step.
Figure 9:
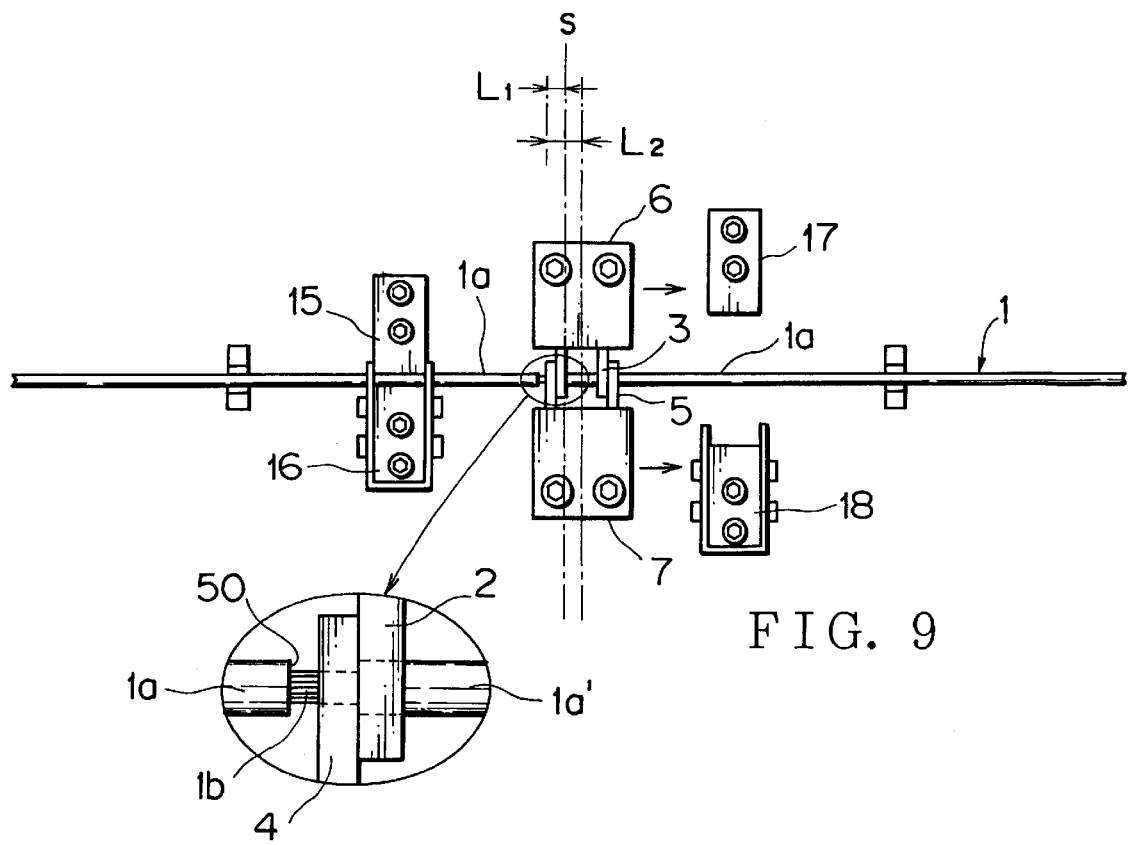
FIG. 9 is a plan view illustrating a step of moving circumferential cutters in a eighth step.

Then, as shown in FIG. 8, the one pair of the wire clamps 17, 18 are released. And as shown in FIG. 9, a pair of the cutter holders 6, 7 are slightly moved integrally with the circumferential cutters 2–5 toward the one pair of the wire clamps 15, 16, while the circumferential cutters 2–5 are closed. An amount L2 of this movement is about 4–10 mm, that is, twice as large as the amount L1 of the previous movement. The value of L2–L1, that is, an amount of the movement from the: center line 3 of the cutter holders is 2–5mm, that is, equal to the amount L1 of the first movement. A distance with which the insulating coating 1a' is separated from the matrix (the insulating coating 1a) inside the circumferential cutters 2, 4 is also the same as in the case of FIG. 6.

As a result of this movement, the circumferentially cut part 50 of the insulating coating 1a of the electric wire 1 is completely separated outside the circumferential cutters 2, 4 adjacent to the other pair of the wire clamps 15, 16. In other words, because the insulating coating 1a of the wire 1 is clamped by the other pair of the wire clamps 15, 16, the insulating coating 1a' will be pulled between the other pair of the wire clamps 15, 16 and the circumferential cutters 2, 4 and cut apart, when the insulating coating 1a' is moved toward the one pair of the wire clamps 17, 18 by means of the circumferential cutters 2, 4. At the same time, the insulating coating 1a' is disengaged from the contact with the core 1b at the connected portions in the upper, lower, left hand and right hand parts of the electric wire in FIG. 19.

The insulating coating 1a is compressed toward the one pair of the wire clamps 17, 18 by the amount of the movement L2–L1. However, because the one pair of the wire clamps 17, 18 are released, the insulating coating 1a will not slacken. The case is the same as in FIG. 6.

Figure 10:
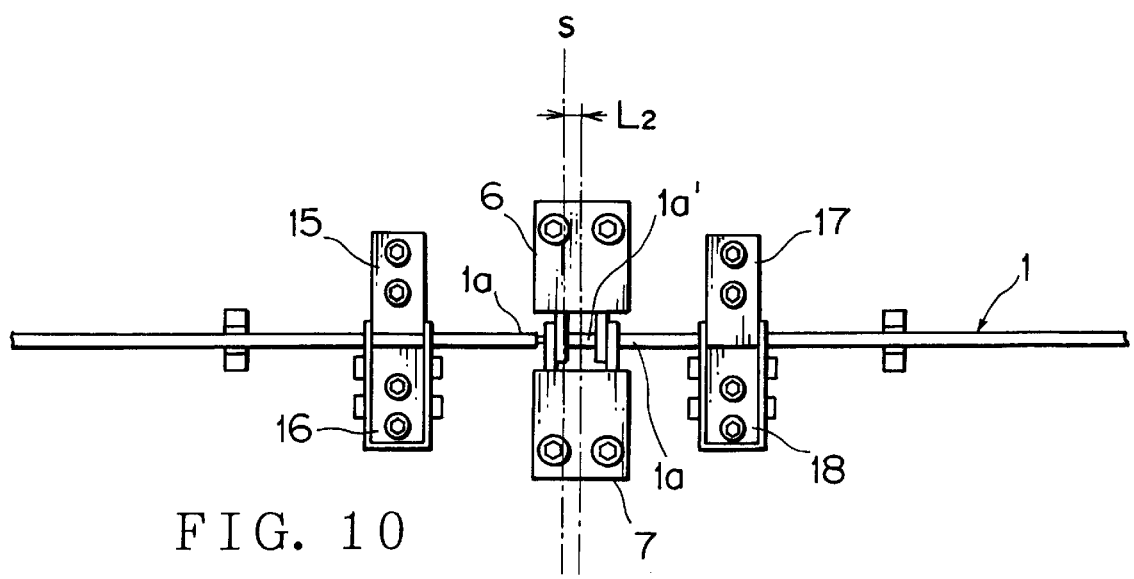
FIG. 10 is a plan view illustrating a step of clamping the electric wire in a ninth step.

Then, the one pair of the wire clamps 17, 18 are closed as shown in FIG. 10. Because the electric wire 1 has not slackened in the step of FIG. 9, the electric wire 1 will not slacken but will be kept in a tightly stretched state when the electric wire 1 is clamped in the step of FIG. 10. Accordingly, the longitudinal cuts can be easily and precisely made in the insulating coating 1a' in the proceeding step.

Figure 11:
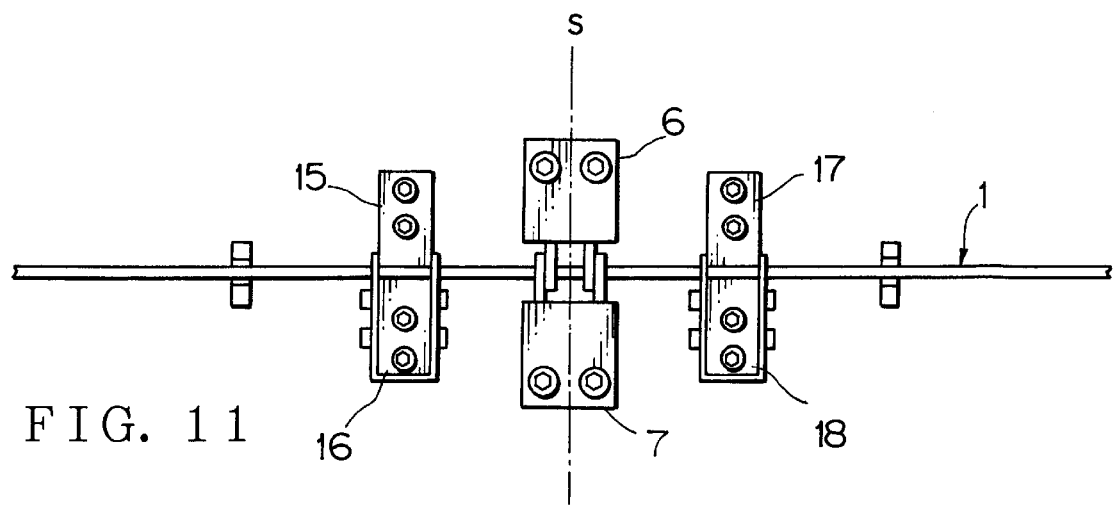
FIG. 11 is a plan view illustrating a step of returning circumferential cutters in a tenth step.

Then, the cutter holders 6, 7 are returned to the central position (the original position) a shown in FIG. 11. This means that the cutter holders 6, 7 are moved toward the other pair of the wire clamps 15, 16 by a distance L2–L1 (about 2–5 mm) Then, the cutter holders 6, 7 are moved outwardly in the diametrical direction of the electric wire to separate the circumferential cutters 2–5 away from each other so as to open and to return them to the original position.

Under this situation, the longitudinal cuts are formed in the insulating coating 1a' of the electric wire 1 by means of the longitudinal cutters 8, 9 and the ultrasonic horn 28, as shown in FIGS. 13 to 16. The waste coatings 10, 11 are automatically removed from the electric wire 1 by the air blow and a self drop.

Figure 12:
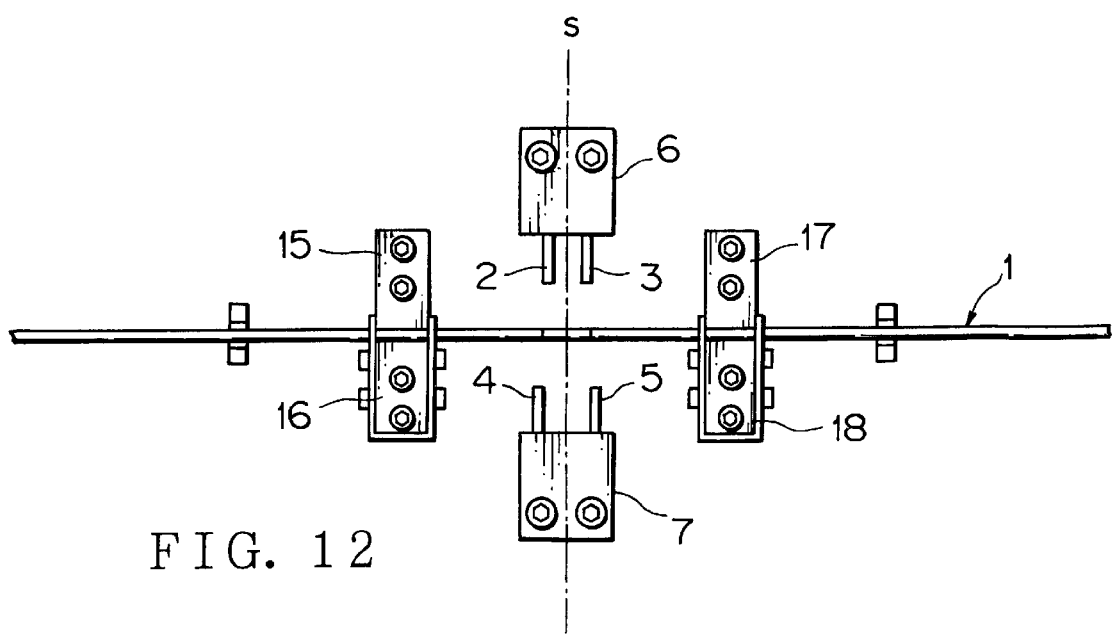
FIG. 12 is a plan view illustrating a step of opening circumferential cutters in a eleventh step.
Figure 13:
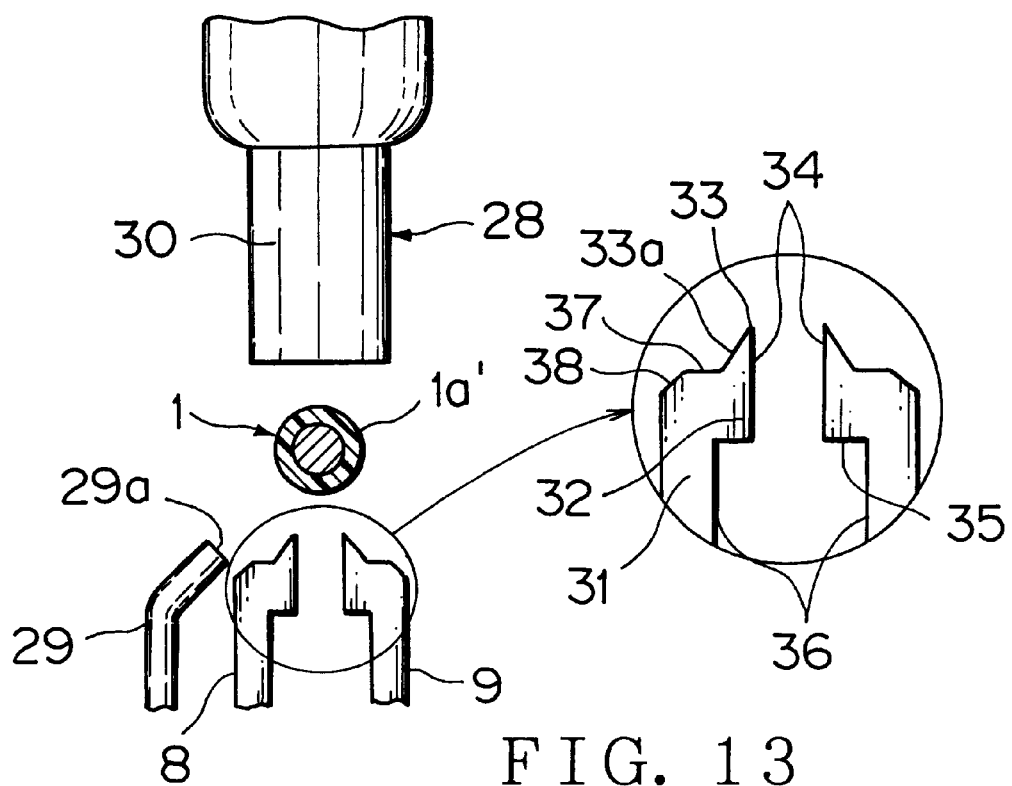
FIG. 13 is a front view illustrating arrangements of a ultrasonic horn and longitudinal cutters.

In particular, there are arranged the ultrasonic horn 28 above the electric wire 1, a pair of longitudinal cutters 8, 9 below the electric wire 1, and an air blowoff tube 29 beside the longitudinal cutters 8, 9, as shown in FIG. 13. As shown in FIG. 12, the electric wire 1 is kept clamped by the pairs of the wire clamps 15–18. The ultrasonic horn 28 and the longitudinal cutter 8, 9 are positioned so as to oppose;to the insulating coating 1a' which have already been cut by means of the circumferential cutters 2–5. The longitudinal cutters 8, 9 are vertically positioned.

The ultrasonic horn 28 includes a wire pressing part 30 in a cylindrical shape having a larger diameter than the outer diameter of the electric wire 1. The longitudinal cutters 8, 9 are symmetrically formed, each of which has a cutter body 31 in a columnar shape, an inwardly projected part 32 above the body 31, and a substantially wedge shaped (inclined) cutting edges 33 which is uprightly formed above the projected part 32. A length of the cutting edge 33 (a width in a longitudinal direction of the electric wire) is almost the same as a distance between the aforementioned circumferential cutters 4 and 5.

An inner faces of the projected part 32 and an inner face of the cutting edge 33 constitute a flat vertical face 34. A stepped part 35 is formed below the vertical face 34. A distance between both inner faces 36 of the bodies 31 below the stepped parts 35 is formed larger than a distance between the opposing vertical faces 34. Each of the cutting edge 33 has an inclined outer face 33a which continues from a horizontal upper end face of a shoulder 37 of the body 31. An outward part of the shoulder 37 is formed in a tapered face 38. Beside the shoulder 37 of one of the longitudinal cutters 8 is located a distal end 29a of the air blowoff tube 29.

Figure 14:
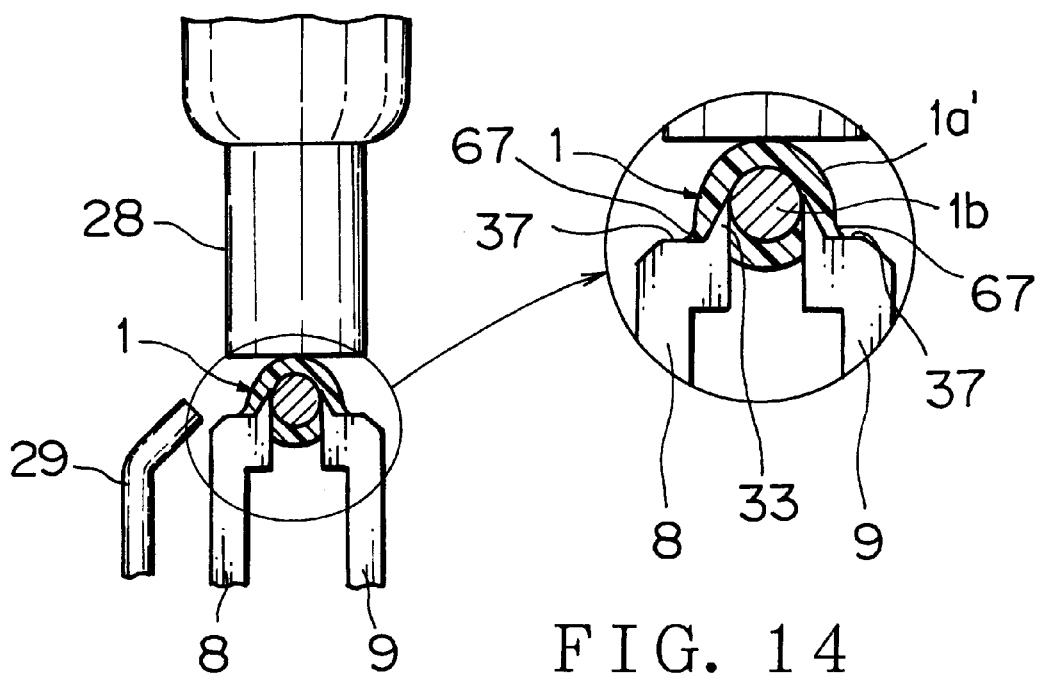
FIG. 14 is a front view illustrating a step of forming longitudinal cuts in a twelfth step.

The electric wire 1 is set on a pair of the longitudinal cutters 8, 9 as shown in FIG. 14, and the ultrasonic horn 28 is pressed on the electric wire 1 from the above, while making ultrasonic vibrations (micro vibrations). In this manner, the longitudinal cuts are formed in the insulating coating 1a' of the electric wire 1, and the connected portions 40, 41, or 42, 43 of the insulating coating 1a above, below, on the left hand and the right hand of the core 1b in FIG. 19 are cut to divide the insulating coating 1a' into an upper and a lower portions.

Because the insulating coating 1a' has been completely separated from the matrix (the insulating coating 1a) at the two longitudinal positions in the previous step in FIG. 9, the insulating coating 1a' is completely separated upward and downward, at an instant when the longitudinal cuts are formed.

As shown in FIG. 14, longitudinally cut edges 67 of the insulating coating 1a' abut against the shoulders 37 along the outer faces 33a (FIG. 13) of the cutting edges 33 of the cutters 8, 9. This forces the insulating coating 1a' to open outwardly and pushes it upwardly (in a direction of peeling) with respect to the core 1b. Thus, the insulating coating 1a' will become easily peelable from the core 1b. At an instant when the longitudinal cut edges 67 have fully contacted the shoulders 37, the longitudinal cutting operation will be stopped.

Then, as shown in FIG. 15, the upper waste coating 10 is easily blown off by an air 44 which is intensely blown off from the air blowoff tube 29, and sucked by the vacuum 12. Because the waste coating 10 is widely opened at the longitudinal cut edges 67 and is easy to receive the compressed air 44, the waste coating 10 will be reliably blown off by the air blow and reliably sucked by the vacuum.

Figure 16:
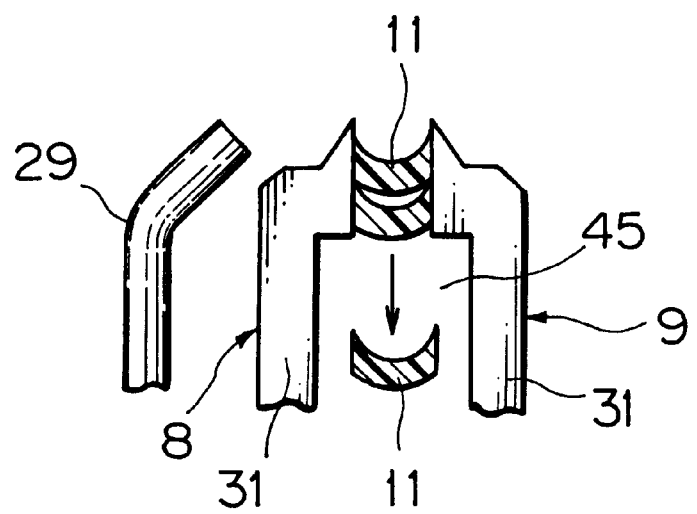
FIG. 16 is a front view illustrating a state where a lower waste coating is falling.

As shown in FIG. 16, the lower waste coating 11 remains between the vertical faces 34 of the projected parts 32 between the cutting edges 33, 33 of the pair of the longitudinal cutters 8, 9. The waste coating 11 falls through a wide space 45 between the bodies 31, 31 by its self weight or pushed by another waste coating 11 of the electric wire 1 which has been worked next.

The vacuum 15 has a wide mouth 46 and a cylindrical part 47 connected to the mouth 46 as shown in FIG. 15. The upper waste coating 10 is automatically collected by means of the vacuum 12. The lower waste coating 11 is reliably collected in a box (not shown) which is disposed below the longitudinal cutters 8, 9.

Figure 17:
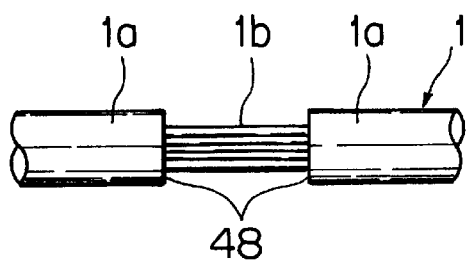
FIG. 17 is a plan view illustrating the electric wire in a state where a coating has been peeled off at an intermediate portion.
Figure 18:
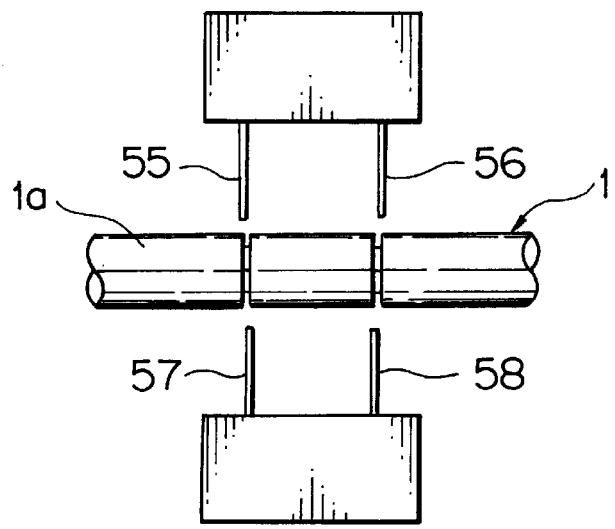
FIG. 18 is a plan view illustrating a step of forming circumferential cuts in a conventional method of stripping an insulated electric wire.

As shown in FIG. 17, the core 1b is exposed at the middle portion of the electric wire 1 in a longitudinal direction. The cut face 48 of the insulating coating 1a will be more beautifully finished than the case where the operator has removed the insulating coating 1a' in vertical directions by hand in the conventional manner. This is because the insulating coating 1a has been accurately pulled in a longitudinal direction of the electric wire in the previous steps (FIGS. 6 and 9), but not diagonally.

It is to be noted that the longitudinal cuts may be at first formed in the insulating coating 1a by means of the longitudinal cutters 8, 9, and the circumferential cuts may be then formed by means of the circumferential cutter 2–5 at forward and backward ends of the longitudinal cuts. It is also to be noted that a single longitudinal cutter may be employed in place of a pair of the longitudinal cutters 8, 9 to cut only a part of the insulating coating 1a in a longitudinal direction. In this case, the waste coating can be removed by directly air blowing the longitudinally cut part.

It is also possible to cut the insulating coating 1a' by means of the longitudinal cutters 8, 9 in a state where the electric wire 1 is pressed downward by a non-shown press or the like, without employing the ultrasonic horn 28. Alternatively, it is also possible to cut the insulating coating 1a' by upwardly moving the longitudinal cutters 8, 9 in a state where the electric wire 1 is fixed. In the method of stripping the electric wire as shown in FIGS. 13 to 15, the manner of making circumferential cuts in the insulating coating 1a is not limited to the method as shown in FIGS. 1 to 12.

As described hereinabove, because the insulating coating is completely disconnected in a circumferential direction, it can be reliably separated away at the longitudinal cuts, and can be easily removed by means of the air blow or the like without applying a force. Accordingly, the waste coatings can be automatically removed but not by hand. Moreover, because the insulating coating is accurately pulled in a longitudinal direction of the electric wire, it can provide beautiful cut faces and an improvement in quality.

Further, because the insulating coating is compressed toward the one pair of the wire clamps in a state where the one pair of the wire clamps are released, the slack of the insulating coating will be absorbed in a longitudinal direction, and the electric wire will not slacken when it is clamped again by the one pair of the wire clamps. This enables the longitudinal cutting in the later step to be conducted accurately and the removal of the insulating coating from the electric wire to be reliably performed, thus enhancing the quality of the product.

Further, with the abutment of the longitudinal cut edges of the insulating coating against the shoulders which continue from the inclined outer faces of the longitudinal cutters, the insulating coating is forced to be outwardly opened and pushed in the peeling direction, thus enabling the removal of the insulating coating to be performed easily.

Then, the insulating coating can be removed by the air blow and the upper waste coating can be sucked by the vacuum. The lower waste coating falls between the longitudinal cutters by its self weight or pushed by another waste coating which has been worked next. Therefore, the working steps can be considerably decreased as compared with the conventional manual removal of the insulating coating, and the cleaning work has thus become unnecessary.

Further, the electric wire is pressed toward the longitudinal cutters to form the longitudinal cuts while making micro vibrations by means of the ultrasonic horn. Accordingly, the insulating coating can be rapidly, easily and reliably cut.

What is claimed is:

1. A method of stripping an insulated electric wire in which circumferential cuts are formed in an insulating coating of the electric wire by means of circumferential cutters, and then longitudinal cuts are formed in said insulating coating by means of longitudinal cutters to remove said insulating coating, comprising the steps of:

moving said circumferential cutters in a longitudinal direction of the electric wire in a first state where said circumferential cuts have been formed in said insulating coating by means of said circumferential cutters, separating said insulating coating at locations where said circumferential cuts are formed, and respectively arranging pairs of wire clamps at both sides of pairs of said circumferential cutters, said circumferential cutters conducting, in a second state where the one pair of said wire clamps hold said electric wire and the other pair of said wire clamps are released, a first movement toward the other pair of said wire clamps, said circumferential cutters then conducting, in a third state where the other pair of said wire clamps hold said electric wire and the one pair of said wire clamps are released, a second movement toward the one pair of said wire clamps along a distance longer than said first movement.

2. The method of stripping the electric wire as claimed in claim 1, further comprising after said circumferential and longitudinal cuts have been formed in said insulating coating respectively by means of said circumferential cutters and said longitudinal cutters, removing said insulating coating by an air blow and sucking an upper waste coating of the insulating coating by a vacuum.

3. The method of stripping the electric wire as claimed in claim 2, further comprising, when said longitudinal cuts are formed in said insulating coating by means of said longitudinal cutters, adapting said longitudinally cut edges of said insulating coating to abut against shoulders of said longitudinal cutters which continue by intersection with inclined outer faces of cutting edges of said longitudinal cutters respectively.

4. The method of stripping the electric wire as claimed in claim 2 further comprising, dropping a lower coating of said insulating coating by a lower waste coating weight between a pair of said longitudinal cutters.

5. A method of stripping an insulated electric wire in which circumferential cuts are formed in an insulating coating of the electric wire by means of circumferential cutters, and then longitudinal cuts are formed in said insulating coating by means of longitudinal cutters to remove said insulating coating, comprising the steps of:

forming said longitudinal cuts in said insulating coating by means of said longitudinal cutters, abutting longitudinally cut edges of said insulating coating against shoulders of said longitudinal cutters which continue by intersecting with inclined outer faces of cutting edges of said longitudinal cutters respectively, and removing said insulating coating by an air blow in a state where said longitudinally cut edges of said insulating coating have abutted against said shoulders.

6. The method of stripping the electric wire as claimed in claim 1 or 5 further comprising, pressing said insulating coating of said electric wire toward said longitudinal cutters while making ultrasonic vibrations by means of an ultrasonic horn.

7. The method of stripping the electric wire as claimed in claim 1 or 5 further comprising, pressing said insulating coating of said electric wire toward said longitudinal cutters while making ultrasonic vibrations by means of an ultrasonic horn.

8. A method of stripping an insulated electric wire in which circumferential cuts are formed in an insulating coating of the electric wire by means of circumferential cutters, and then longitudinal cuts are formed in said insulating coating by means of longitudinal cutters to remove said insulating coating, comprising the steps of:

moving said circumferential cutters in a longitudinal direction of the electric wire in a first state where said circumferential cuts have been formed in said insulating coating by means of said circumferential cutters, separating said insulating coating at locations where said circumferential cuts are formed, and after said circumferential and longitudinal cuts have been formed in said insulating coating respectively by means of said circumferential cutters and said longitudinal cutters, removing said insulating coating by an air blow and sucking an upper waste coating of the insulating coating by a vacuum.

9. A method of stripping an insulated electric wire in which circumferential cuts are formed in an insulating coating of the electric wire by means of circumferential cutters, and then longitudinal cuts are formed in said insulating coating by means of longitudinal cutters to remove said insulating coating, comprising the steps of:

moving said circumferential cutters in a longitudinal direction of the electric wire in a first state where said circumferential cuts have been formed in said insulating coating by means of said circumferential cutters, separating said insulating coating at locations where said circumferential cuts are formed, after said circumferential and longitudinal cuts have been formed in said insulating coating respectively by means of said circumferential cutters and said longitudinal cutters, removing said insulating coating by an air blow and sucking an upper waste coating of the insulating coating by a vacuum, and when said longitudinal cuts are formed in said insulating coating by means of said longitudinal cutter, adapting said longitudinally cut edges of said insulating coating to abut against shoulders of said longitudinal cutters which continue by intersecting with inclined outer faces of cutting edges of said longitudinal cutters respectively.

10. A method of stripping an insulated electric wire in which circumferential cuts are formed in an insulating coating of the electric wire by means of circumferential cutters, and then longitudinal cuts are formed in said insulating coating by means of longitudinal cutters to remove said insulating coating, comprising the steps of:

moving said circumferential cutters in a longitudinal direction of the electric wire in a first state where said circumferential cuts have been formed in said insulating coating by means of said circumferential cutters, separating said insulating coating at locations where said circumferential cuts are formed, after said circumferential and longitudinal cuts have been formed in said insulating coating respectively by means of said circumferential cutters and said longitudinal cutters, removing said insulating coating by an air blow and sucking an upper waste coating of the insulating coating by a vacuum and dropping a lower portion of said wasted coating of said insulating coating by a lower waste coating weight between a pair of said longitudinal cutters.

* * * * *